United States Patent
Chen et al.

(10) Patent No.: US 11,909,301 B2
(45) Date of Patent: Feb. 20, 2024

(54) SWITCHING POWER SUPPLY AND INTERMITTENT POWER SAVING MODE CONTROL CIRCUIT AND METHOD THEREOF

(71) Applicant: SILERGY SEMICONDUCTOR TECHNOLOGY (HANGZHOU) CO., LTD., Hangzhou (CN)

(72) Inventors: Zhan Chen, Hangzhou (CN); Qiukai Huang, Hangzhou (CN)

(73) Assignee: SILERGY SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 84 days.

(21) Appl. No.: 17/474,671

(22) Filed: Sep. 14, 2021

(65) Prior Publication Data
US 2022/0085710 A1 Mar. 17, 2022

(30) Foreign Application Priority Data
Sep. 15, 2020 (CN) .......................... 202010969223.4

(51) Int. Cl.
*H02M 1/00* (2006.01)
(52) U.S. Cl.
CPC ....... *H02M 1/0035* (2021.05); *H02M 1/0025* (2021.05)
(58) Field of Classification Search
CPC ........................... H02M 1/0035; H02M 1/0025
See application file for complete search history.

(56) References Cited

U.S. PATENT DOCUMENTS

| 8,274,801 | B2 | 9/2012 | Shi et al. |
| 8,749,213 | B2 | 6/2014 | Chen |
| 8,854,018 | B2 | 10/2014 | Huang et al. |
| 9,190,898 | B2 | 11/2015 | Brinlee et al. |
| 9,698,693 | B2 | 7/2017 | An |
| 11,398,767 | B2 * | 7/2022 | Degen ............... H02M 3/33569 |
| 2010/0308654 | A1 | 12/2010 | Chen |

(Continued)

FOREIGN PATENT DOCUMENTS

| CN | 101667782 A | 3/2010 |
| CN | 101800474 B | 6/2012 |

(Continued)

OTHER PUBLICATIONS

Copy of Office Action for Chinese Patent Application No. 202010969223.4, dated May 27, 2021, 5 pages.

*Primary Examiner* — Peter M Novak
(74) *Attorney, Agent, or Firm* — Westman, Champlin & Koehler, P.A.

(57) ABSTRACT

The present disclose relates to an intermittent power saving mode control circuit and method thereof, comprising: a mode indication signal generating circuit configured to generate a mode indication signal according to an output voltage compensation signal, a first reference voltage, and a second reference voltage, the mode indication signal is configured to indicate that a switching power supply is working in a work mode or a sleep mode; wherein the second reference voltage is adjusted according to a frequency of the mode indication signal, so that the frequency of the mode indication signal is maintained within a predetermined range.

20 Claims, 5 Drawing Sheets

(56) References Cited

U.S. PATENT DOCUMENTS

| | | | |
|---|---|---|---|
| 2011/0037446 A1* | 2/2011 | Engelhardt | H02M 3/1582 |
| | | | 323/282 |
| 2011/0057637 A1* | 3/2011 | Liu | H02M 3/156 |
| | | | 323/287 |
| 2011/0084677 A1 | 4/2011 | Shi et al. | |
| 2012/0250378 A1* | 10/2012 | Kok | H02M 3/33507 |
| | | | 363/78 |
| 2013/0250620 A1 | 9/2013 | Huang et al. | |
| 2014/0009978 A1 | 1/2014 | Brinlee et al. | |
| 2014/0232190 A1 | 8/2014 | Chen | |
| 2014/0285163 A1* | 9/2014 | Lin | H02M 1/40 |
| | | | 323/205 |
| 2016/0149493 A1 | 5/2016 | An | |
| 2017/0373604 A1 | 12/2017 | Chen | |
| 2019/0115836 A1 | 4/2019 | Liu et al. | |

FOREIGN PATENT DOCUMENTS

| | | |
|---|---|---|
| CN | 103326564 A | 9/2013 |
| CN | 103401404 A | 11/2013 |
| CN | 103532392 A | 1/2014 |
| CN | 105226933 A | 1/2016 |
| CN | 104393743 B | 4/2017 |

* cited by examiner

SWITCHING POWER SUPPLY AND INTERMITTENT POWER SAVING MODE CONTROL CIRCUIT AND METHOD THEREOF

CROSS-REFERENCE TO RELATED APPLICATION

This application claims priority to the Chinese Patent Application No. 202010969223.4, filed on Sep. 15, 2020 and entitled "Switching Power Supply and Intermittent Power Saving Mode Control Circuit and Method Thereof", which are incorporated herein by reference in its entirety in this disclosure.

BACKGROUND OF THE DISCLOSURE

Field of Technology

The present disclosure relates to the technical field of power electronics, in particular to a switching power supply and intermittent power saving mode control circuit and control method for intermittent power saving mode.

Description of the Related Art

A switching power supply will enter an intermittent power saving mode (Burst mode) when a load is very light. In the Burst mode, a Burst frequency is related to an input voltage, a load current, a capacity of an output capacitor, etc. Although a switching frequency is usually limited to 25 kHz or more, the Burst frequency may still be lower than 20 kHz. Without special restrictions, at some specific operating points, the Burst frequency will enter 1 kHz-10 kHz, which is a relatively sensitive frequency range of human hearing. In mass production, some transformers that are not sufficiently impregnated/encapsulated will generate noise and affect normal use of a product.

SUMMARY

In order to solve the above technical problem, the present disclosure provides a switching power supply and intermittent power saving mode control circuit and method thereof to solve an existing problem of large audible noise.

The disclosure provides a method for controlling the Burst frequency. Under the condition of different input voltages, load currents and output capacitances, by adjusting the threshold of the Burst, the Burst frequency is controlled at 100 Hz-1 kHz by a feedback method, which can reduce the light load noise of switching power supply.

According to a first aspect of the present disclosure, there is provided an intermittent power saving mode control method. The method includes following steps.

Setting a first frequency characterizing a lower limit and a second frequency characterizing an upper limit according to a noise frequency that needs to be shielded.

Monitoring an alternating frequency of a switching power supply operating in a work mode and a sleep mode.

Adjusting time lengths corresponding to the work mode and the sleep mode in an alternating period, so that the alternating frequency is within a range of the first frequency to the second frequency.

Preferably, the alternating frequency is adjusted according to a magnitude relationship between the current alternating frequency and the first frequency and the second frequency, and when the current alternating frequency is outside the range of the first frequency to the second frequency, the time lengths corresponding to the work mode and the sleep mode in the alternating period are adjusted to adjust the alternating frequency.

Preferably, controlling the switching power supply to operate in the work mode or the sleep mode according to an output voltage compensation signal characterizing an error between an output voltage of the switching power supply and an expected value.

Preferably, controlling the switching power supply to operate in the sleep mode when the output voltage compensation signal drops below a first reference voltage; and controlling the switching power supply to operate in the work mode when the output voltage compensation signal rises to be greater than a second reference voltage, wherein the second reference voltage is greater than the first reference voltage.

Preferably, generating a mode indication signal according to the output voltage compensation signal, the first reference voltage, and the second reference voltage, and a frequency of the mode indication signal is the same as the alternating frequency, wherein, the first reference voltage is constant, and the second reference voltage is adjusted according to the frequency of the mode indication signal, so that the alternating frequency is within the range of the first frequency to the second frequency.

Preferably, decreasing the second reference voltage when the frequency of the mode indication signal is less than the first frequency; and increasing the second reference voltage when the frequency of the mode indication signal is greater than the second frequency, wherein, the second frequency is greater than the first frequency.

Preferably, the second reference voltage remains unchanged when the frequency of the mode indication signal is greater than the first frequency and less than the second frequency.

According to a second aspect of the present disclosure, there is provided an intermittent power saving mode control circuit, wherein the control circuit is configured to:
set a first frequency characterizing a lower limit and a second frequency characterizing an upper limit according to a noise frequency that needs to be shielded;
monitor an alternating frequency of a switching power supply operating in a work mode and a sleep mode; and
adjust time lengths corresponding to the work mode and the sleep mode in an alternating period, so that the alternating frequency is within a range of the first frequency to the second frequency.

Preferably, the alternating frequency is adjusted according to a magnitude relationship between the current alternating frequency and the first frequency and the second frequency, and when the current alternating frequency is outside the range of the first frequency to the second frequency, the time lengths corresponding to the work mode and the sleep mode in the alternating period are adjusted to adjust the alternating frequency.

Preferably, the control circuit is configured to control the switching power supply to operate in the work mode or the sleep mode according to an output voltage compensation signal characterizing an error between an output voltage of the switching power supply and an expected value.

Preferably, the control circuit is configured to control the switching power supply to operate in the sleep mode when the output voltage compensation signal drops below a first reference voltage, and control the switching power supply to operate in the work mode when the output voltage compensation signal rises to be greater than a second reference voltage, wherein the second reference voltage is greater than the first reference voltage.

Preferably, further comprising: a mode indication signal generating circuit configured to generate a mode indication signal according to the output voltage compensation signal, the first reference voltage, and the second reference voltage, and a frequency of the mode indication signal is the same as the alternating frequency, wherein, the first reference voltage is constant and the second reference voltage is adjusted according to the frequency of the mode indication signal, so that the alternating frequency is within the range of the first frequency to the second frequency.

Preferably, the control circuit is configured to decrease the second reference voltage when the frequency of the mode indication signal is less than the first frequency, and increase the second reference voltage when the frequency of the mode indication signal is greater than the second frequency, wherein, the second frequency is greater than the first frequency.

Preferably, the control circuit is configured to control the second reference voltage to remain unchanged when the frequency of the mode indication signal is greater than the first frequency and less than the second frequency.

Preferably, further comprising: a second reference voltage generating circuit configured to generate the second reference voltage according to the mode indication signal, a first time value characterizing the first frequency and a second time value characterizing the second frequency.

Preferably, when the switching power supply is in a light load condition, the mode indication signal switches between two states, so that the switching power supply enters an intermittent power saving mode; when the switching power supply is in a normal or heavy load condition, a state of the mode indication signal remains unchanged.

Preferably, the second reference voltage generating circuit comprises:
a first detection circuit configured to detect whether a cycle duration of the mode indication signal exceeds the first time value characterizing the first frequency, and generate a first adjustment signal for instructing to decrease the second reference voltage when the cycle duration of the mode indication signal exceeds the first time value;
a second detection circuit configured to detect whether the cycle duration of the mode indication signal is less than the second time value characterizing the second frequency, and generate a second adjustment signal for instructing to increase the second reference voltage when the cycle duration of the mode indication signal is less than the second time value;
an adjustment circuit configured to adjust the second reference voltage according to the first adjustment signal and the second adjustment signal.

Preferably, the first detection circuit comprises:
a first timing circuit, configured to generate a first timing signal according to the mode indication signal and the first time value;
a first one-shot circuit configured to generate a first single pulse signal according to the mode indication signal;
a first logic circuit configured to generate the first adjustment signal according to the first timing signal and the first single pulse signal;
the second detection circuit comprises:
a second timing circuit configured to generate a second timing signal according to the mode indication signal and the second time value;
a second one-shot circuit configured to generate a second single pulse signal according to the mode indication signal;
a second logic circuit configured to generate the second adjustment signal according to the second timing signal and the second single pulse signal.

Preferably, the adjustment circuit comprises:
a first adjustment circuit configured to reduce the second reference voltage when the first adjustment signal is valid;
a second adjustment circuit configured to increase the second reference voltage when the second adjustment signal is valid;
an adjusting capacitor, coupled to both the first adjustment circuit and the second adjustment circuit, and configured to generate the second reference voltage at a non-grounded port.

Preferably, the mode indication signal generating circuit comprises:
a first comparator configured to compare the output voltage compensation signal with the first reference voltage and output a first comparison signal;
a second comparator configured to compare the output voltage compensation signal with the second reference voltage and output a second comparison signal;
a logic circuit configured to generate the mode indication signal according to the first comparison signal and the second comparison signal.

According to a third aspect of the present disclosure, there is provided a switching power supply, comprising:
the above-mentioned intermittent power saving mode control circuit.

In the intermittent power saving mode control circuit of the present disclosure, in the Burst mode, by setting the stable first reference voltage and the variable second reference voltage, and adjusting the second reference voltage is adjusted according to the Burst frequency, the system enters the sleep mode when the output voltage compensation signal is lower than the first reference voltage, and resumes the work mode when the output voltage compensation signal is higher than the second reference voltage. If the Burst frequency is lower than the first frequency, the second reference voltage is reduced, so that the Burst frequency is increased; if the Burst frequency is higher than the second frequency, the second reference voltage is increased, so that the Burst frequency is decreased. Therefore, no matter how the input voltage, load current and output capacitance change, the Burst frequency can be limited between two frequency thresholds, and will not enter the range of 1 k-10 kHz, so that the noise at light load is reduced.

BRIEF DESCRIPTION OF THE DRAWINGS

In order to explain the embodiments of the present disclosure or the technical solutions in the prior art more clearly, the drawings corresponding to the descriptions of the embodiments or the prior art will be briefly introduced below. Obviously, the drawings in the following description are only examples of the present disclosure. For those skilled in the art, other drawings can be obtained according to the provided drawings without creative work.

DETAILED DESCRIPTION OF THE DISCLOSURE

The present disclosure will be described below based on examples, but the present disclosure is not limited to these examples. In the following detailed description of the present disclosure, some specific details are described in detail. Those skilled in the art can fully understand the present disclosure without the description of these details. In order to avoid obscuring the essence of the present disclosure, the well-known methods, processes, procedures, components, and circuits are not described in detail.

In addition, those skilled in the art should understand that the drawings provided herein are for illustrative purposes, and the drawings are not necessarily drawn to scale.

At the same time, it should be understood that in the following description, "circuit" refers to a conductive loop formed by at least one element or sub-circuit through electrical or electromagnetic connection. When an element or circuit is referred to as being "connected to" another element or an element/circuit is referred to as being "connected" between two nodes, it can be directly coupled or connected to the other element or there may be intervening elements. The connection can be physical, logical, or a combination thereof. On the contrary, when an element is referred to as being "directly coupled to" or "directly connected to" another element, it means that there is no intervening element between the two.

Unless the context clearly requires, the entire specification and claims, "including", "comprising" and other similar phrases should be interpreted as inclusive rather than exclusive or exhaustive meaning; that is to say, it means "including but not limited to".

In the description of the present disclosure, it should be understood that the phrases "first", "second", etc. are only used for descriptive purposes, and cannot be understood as indicating or implying relative importance. In addition, in the description of the present disclosure, "plurality" means two or more unless otherwise specified.

In the present disclosure, "intermittent power saving mode" is referred to as "Burst mode" and vice versa, in which a switching power supply operating in a work mode and a sleep mode. When the load is very light, the switching power supply operates under the Burst mode.

Figure 1:
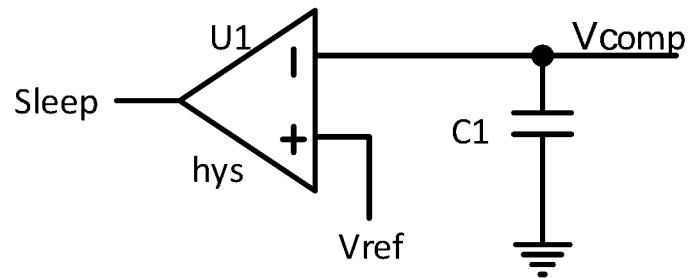
FIG. 1 shows a circuit structure diagram of an intermittent power saving mode control circuit in a prior art.
Figure 2:
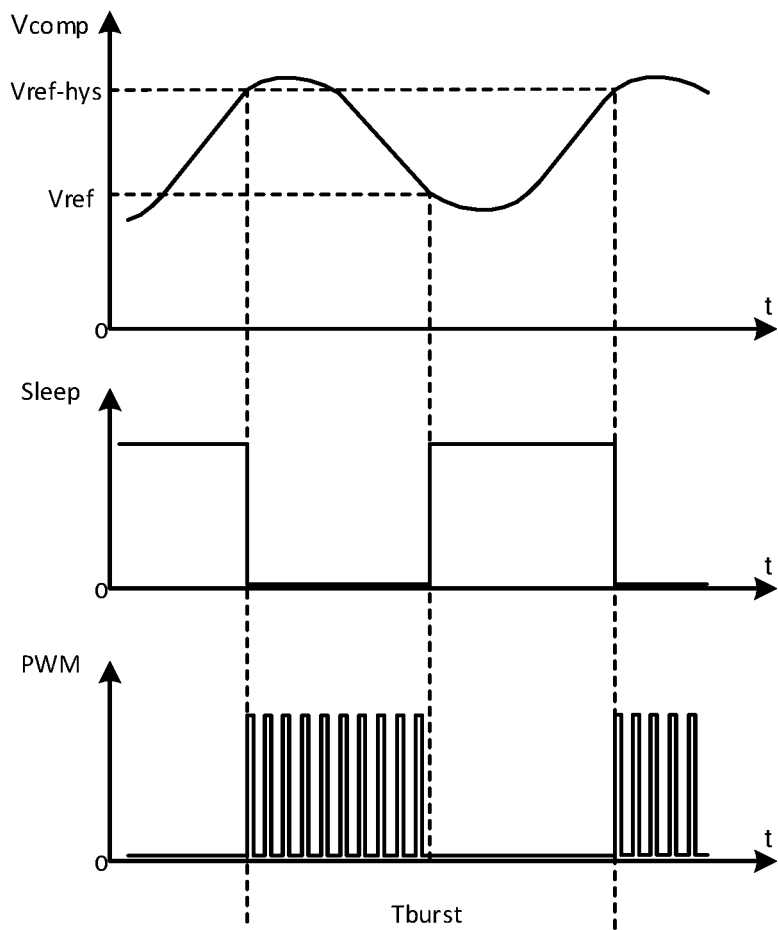
FIG. 2 shows a working waveform diagram of the intermittent power saving mode control circuit in the prior art.

FIG. 1 shows a circuit structure diagram of an intermittent power saving mode control circuit in a prior art, and FIG. 2 shows a working waveform diagram of the intermittent power saving mode control circuit in the prior art. A switching power supply in the prior art will enter an intermittent power saving mode (referred to as a Burst mode) when a load is very light. In the prior art, a commonly used technical solution for achieving the Burst mode is shown in FIG. 1. Wherein, Vcomp is a feedback voltage of a main power loop of the switching power supply, which is recorded as an output voltage compensation signal Vcomp, U1 is an operational amplifier for Burst control, and hys is a hysteresis voltage. When the load becomes lighter, the output voltage will increase, so that the output voltage compensation signal Vcomp decreases. When the output voltage compensation signal Vcomp is lower than a reference voltage Vref, a sleep indication signal Sleep is set to a high level, and a system stops working and enters a sleep mode accordingly; at this time, the output voltage of the main power circuit will decrease, so that the output voltage compensation signal Vcomp will increase. When the output voltage compensation signal Vcomp is higher than a sum of the reference voltage Vref and the hysteresis voltage hys, the system returns to a work mode. The working waveform is shown in FIG. 2. Under certain working conditions, a Burst frequency (that is, the frequency of the sleep indication signal Sleep) will enter 1 kHz-10 kHz, which is a relatively sensitive frequency range of human hearing, so noise will be generated, which will affect normal use of the product.

Based on above situation, the present disclosure provides an intermittent power saving mode control circuit and control method thereof. By adjusting a threshold of the Burst frequency of the Burst mode, the Burst frequency is controlled within a range of a first frequency to a second frequency (for example, 100 Hz-1 kHz) by a feedback method under different input voltages, load currents and output capacitances, so that the light load noise of the switching power supply can be reduced.

Specifically, the intermittent power saving mode control method of the present disclosure comprises: firstly, setting a first frequency characterizing a lower limit and a second frequency characterizing an upper limit according to a noise frequency that needs to be shielded; then monitoring an alternating frequency of the switching power supply operating in the work mode and the sleep mode; finally, by adjusting a time length of the work mode and the sleep mode in an alternating period, the alternating frequency is within a range of the first frequency to the second frequency. The alternating frequency is a frequency from the current work mode to the next work mode of the switching power supply in the intermittent power saving mode, or a frequency from the current sleep mode to the next sleep mode. The alternating frequency is adjusted according to a relationship between the currently monitored alternating frequency and the first frequency and the second frequency. When the currently monitored alternating frequency is outside the range of the first frequency to the second frequency, the time length of the work mode and the sleep mode in the alternating period is adjusted to adjust the alternating frequency. When the output voltage compensation signal drops below a first reference voltage, the switching power supply operates in the sleep mode; when the output voltage compensation signal rises to be greater than a second reference voltage, the switching power supply operates in the work mode.

The intermittent power saving mode control circuit of the present disclosure is configured to generate a mode indication signal according to the output voltage compensation signal, the first reference voltage, and the second reference voltage, and a frequency of the mode indication signal is the same as the alternating frequency; wherein, the second reference voltage is adaptively adjusted according to the frequency of the mode indication signal, so that the alternating frequency is within the range of the first frequency to the second frequency.

Figure 3:
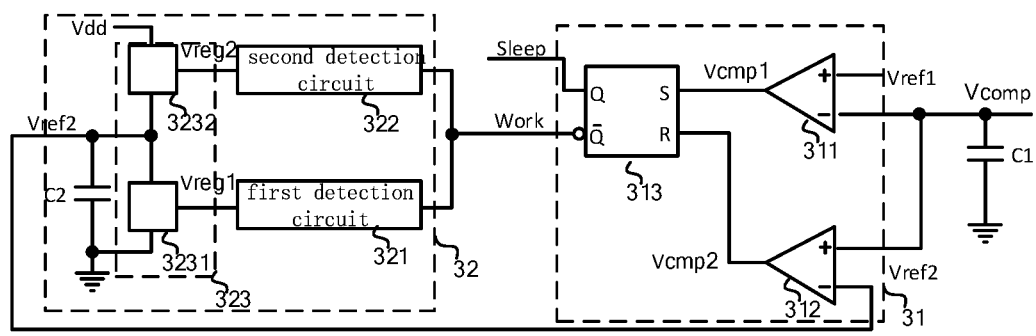
FIG. 3 shows a circuit structure diagram of an intermittent power saving mode control circuit according to a first embodiment of the present disclosure.

FIG. 3 shows a circuit structure diagram of the intermittent power saving mode control circuit according to the first embodiment of the present disclosure. As shown in FIG. 3, the intermittent power saving mode control circuit of the present disclosure includes a mode indication signal generating circuit 31 and a second reference voltage generating circuit 32.

Specifically, the mode indication signal generating circuit 31 is configured to generate the mode indication signal according to the output voltage compensation signal Vcomp which characterizes an error between the output voltage of the switching power supply and its expected value, the first reference voltage Vref1, and the second reference voltage Vref2, where the mode indication signal is configured to indicate that the switching power supply is working in the work mode or the sleep mode. In the work mode, a power switch of the switching power supply is periodically turned on and turned off by a PWM control signal, and the PWM control signal is configured to have a predetermined operating frequency; and in the sleep mode, the power switch of the switching power supply remains off. The output voltage compensation signal Vcomp is configured to characterize the error between the output voltage of the switching power supply and its expected value. Wherein, the second reference voltage Vref2 is adaptively adjusted according to the frequency of the mode indication signal, so that the frequency of the mode indication signal is maintained within a predetermined range, which is between the first frequency and the second frequency.

Preferably, when the frequency of the mode indication signal is less than the first frequency, the Burst frequency is increased by reducing the second reference voltage Vref2; when the frequency of the mode indication signal is greater than the second frequency, the Burst frequency is decreased by increasing the second reference voltage Vref2; when the frequency of the mode indication signal is greater than the first frequency and less than the second frequency, the second reference voltage Vref remains unchanged to maintain the Burst frequency unchanged. Wherein, the second frequency is greater than the first frequency.

Specifically, the intermittent power saving mode control circuit of the present disclosure uses the mode indication signal generating circuit 31 to achieve that when the output voltage compensation signal Vcomp drops below the first reference voltage Vref1, the mode indication signal is in a first state, so that the switch power supply operates in the sleep mode; when the output voltage compensation signal Vcomp rises to be greater than the second reference voltage Vref2, the mode indication signal is in a second state, so that the switching power supply operates in the work mode.

Further, in the embodiment of the present disclosure, the mode indication signal generating circuit 31 includes a first comparator 311, a second comparator 312, and a logic circuit 313. Wherein, the first comparator 311 is configured to compare the output voltage compensation signal Vcomp with the first reference voltage Vref1 and output a first comparison signal Vcmp1. A non-inverting input terminal of the first comparator 311 receives the first reference voltage Vref1, an inverting input terminal of the first comparator 311 receives the output voltage compensation signal Vcomp, and an output terminal of the first comparator 311 generates the first comparison signal Vcmp1. The second comparator 312 is configured to compare the output voltage compensation signal Vcomp with the second reference voltage Vref2 and output a second comparison signal Vcmp2. An inverting input terminal of the second comparator 312 receives the second reference voltage Vref2, a non-inverting input terminal of the second comparator 312 receives the output voltage compensation signal Vcomp, and an output terminal of the second comparator 312 generates a second comparison signal Vcmp2. The logic circuit 313 is configured to generate the mode indication signal according to the first comparison signal Vcmp1 and the second comparison signal Vcmp2. Here, the logic circuit 313 is implemented by an SR flip-flop, an S terminal of the SR flip-flop receives the first comparison signal Vcmp1, a R terminal of the SR flip-flop receives the second comparison signal Vcmp2, an output terminal Q of the SR flip-flop generates the sleep indication signal Sleep, and an output terminal Q generates a work indication signal Work.

It should be noted that since the sleep indication signal Sleep and the work indication signal Work are complementary, both can be used as the mode indication signal. In the embodiment of the present disclosure, the work indication signal Work as the mode indication signal is taken as an example for description. When the output voltage compensation signal Vcomp drops below the first reference voltage Vref1, the first comparison signal Vcmp1 is set high so that the work indication signal Work is in the first state (for example, low level), thereby making the switching power supply work in sleep mode; when the output voltage compensation signal Vcomp rises to be greater than the second reference voltage Vref2, the second comparison signal Vcmp2 is set high so that the work indication signal Work is in the second state (for example, a high level), thereby making the switching power supply work in the work mode. Of course, it should be understood that when the sleep indication signal Sleep is used as the mode indication signal, some simple and adaptive transformations are needed, as long as the sleep indication signal Sleep can adjust the second reference voltage Vref2 by the same method.

It should also be noted that the mode indication signal will switch between the two states only when the switching power supply is in a light load condition, so that the switching power supply enters the intermittent power saving mode, that is, an operation mode that switches between the work mode and the sleep mode. When the switching power supply is in a normal or heavy load condition, the state of the mode indication signal remains unchanged.

Specifically, the second reference voltage generating circuit 32 is configured to generate the second reference voltage Vref2 according to the mode indication signal (work indication signal Work), a first time value T1 characterizing the first frequency and a second time value T2 characterizing the second frequency.

Further, in the embodiment of the present disclosure, the second reference voltage generating circuit 32 includes a first detection circuit 321, a second detection circuit 322, and an adjustment circuit 323. The first detection circuit 321 is configured to detect whether a cycle duration of the work indication signal Work exceeds the first time value T1 characterizing the first frequency, and if yes, generate a first adjustment signal Vreg1 for instructing to decrease the second reference voltage Vref2 when it is at the valid level. The second detection circuit 322 is configured to detect whether the cycle duration of the work indication signal Work is lower than the second time value T2 characterizing the second frequency, and if yes, generate a second adjustment signal Vreg2 for instructing to increase the second reference voltage Vref2 when it is at the valid level. The adjustment circuit 323 is configured to adjust an amplitude of the second reference voltage Vref2 according to the first adjustment signal Vreg1 and the second adjustment signal Vreg2.

More specifically, the adjustment circuit 323 may include a first adjustment circuit 3231, a second adjustment circuit 3232, and an adjusting capacitor C2. Wherein, the first adjustment circuit 3231 is configured to decrease the second reference voltage Vref2 when the first adjustment signal Vreg1 is valid; the second adjustment circuit 3232 is configured to increase the second reference voltage Vref2 when the second adjustment signal Vreg2 is valid. One port of the adjusting capacitor C2 is coupled to ground, and another port is coupled to both the first adjustment circuit 3231 and the second adjustment circuit 3232, and the adjusting capacitor C2 is configured to generate the second reference voltage Vref2 at its non-grounded port. In one embodiment, the first adjustment circuit 3231 may include a triode, a transistor, or other circuits capable of controlling current, and the second adjustment circuit 3232 may also include the triode, a transistor, or other circuits capable of controlling current.

As a result, in the intermittent power saving mode control circuit of the present disclosure, in the Burst mode, by setting the stable first reference voltage Vref1 and the variable second reference voltage Vref2, and adjusting the second reference voltage Vref2 when the Burst frequency is not in the preset range, the system enters the sleep mode when the output voltage compensation signal Vcomp is lower than the first reference voltage Vref1, and returns to the work mode when the output voltage compensation signal Vcomp is higher than the second reference voltage Vref2. If the Burst frequency is lower than the first frequency, the second reference voltage Vref2 is reduced, so that the Burst frequency is increased; if the Burst frequency is higher than the second frequency, the second reference voltage Vref2 is increased, so that the Burst frequency is decreased. This achieves that no matter how the input voltage, load current and output capacitance change, the Burst frequency can be limited between the two frequency thresholds, and will not enter the range of 1 k-10 kHz, so that the noise at light load is reduced.

Figure 4:
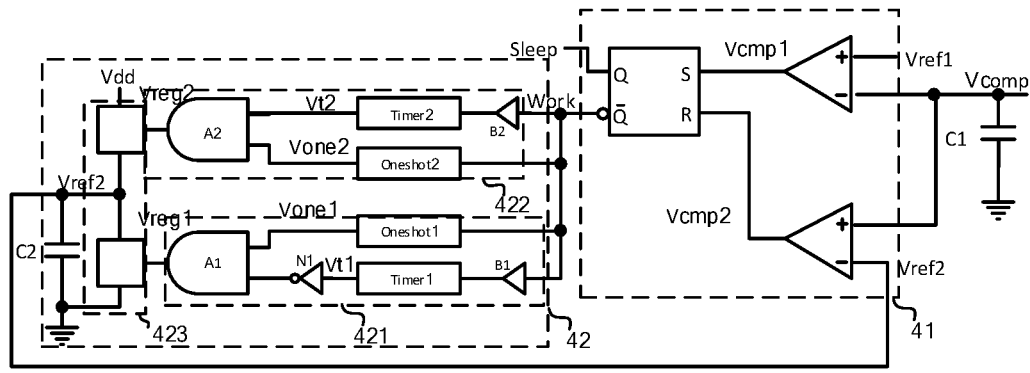
FIG. 4 shows a circuit structure diagram of an intermittent power saving mode control circuit according to a second embodiment of the present disclosure.

FIG. 4 shows a circuit structure diagram of the intermittent power saving mode control circuit according to the second embodiment of the present disclosure. It is different from the intermittent power saving mode control circuit of the first embodiment in that it specifically discloses an implementation of a first detection circuit 421 and a second detection circuit 422. The rest of the circuit structures and functions are the same, and will not be repeated here. As shown in FIG. 4, the intermittent power saving mode control circuit includes a mode indication signal generating circuit 41 and a second reference voltage generating circuit 42. The second reference voltage generating circuit 42 includes the first detection circuit 421, the second detection circuit 422, and an adjustment circuit 423.

Preferably, the first detection circuit 421 includes a first timing circuit Timer1, a first one-shot circuit Oneshot1, and a first logic circuit A1. Specifically, the first timing circuit Timer1 is configured to generate a first timing signal Vt1 according to the work indication signal Work and the first time value T1 characterizing the first frequency. The first timing circuit Timer1 clears its time value according to a rising edge of the work indication signal Work, and outputs a high-level first timing signal Vt1 when the time value is not greater than the first time value T1, and outputs a low-level first timing signal Vt1 after the time value exceeds the first time value T1. The first one-shot circuit Oneshot1 is configured to generate a first single pulse signal Vone1 with a narrow pulse width according to the rising edge of the work indication signal Work. The first logic circuit A1 is configured to generate the first adjustment signal Vreg1 according to the first timing signal Vt1 and the first single pulse signal Vone1. Specifically, the first logic circuit A1 is configured to generate the valid first adjustment signal Vreg1 when the first timing signal Vt1 is at a low level and the first single pulse signal Vone1 is at a high level. In the embodiment of the present disclosure, since the first logic circuit A1 is implemented by an AND gate circuit, the first timing signal Vt1 is input to the first logic circuit A1 through a NOT gate N1.

Preferably, the second detection circuit includes 422 includes a second timing circuit Timer2, a second one-shot circuit Oneshot2, and a second logic circuit A2. Specifically, the second timing circuit Timer2 is configured to generate a second timing signal Vt2 according to the work indication signal Work and the second time value T2 that characterizing the second frequency. The second timing circuit Timer2 clears its time value according to the rising edge of the work indication signal Work, and outputs a high-level second timing signal Vt2 when the time value is not greater than the second time value T2, and outputs a low-level second timing signal Vt2 after the time value T2 exceeds the second time value T2. The second one-shot circuit Oneshot2 is configured to generate a second single pulse signal Vone2 with a narrow pulse width according to the rising edge of the work indication signal Work. The second logic circuit A2 is configured to generate the second adjustment signal Vreg2 according to the second timing signal Vt2 and the second single pulse signal Vone2. Specifically, the second logic circuit A2 is configured to generate the valid second adjustment signal Vreg2 when the second timing signal Vt2 is at a high level and the second single pulse signal Vone2 is at a high level.

Preferably, the first detection circuit 421 further includes a buffer B1 coupled to an input port of the first timing circuit Timer1, the second detection circuit including 422 further includes a buffer B2 coupled to an input port of the second timing circuit Timer2, and the buffer B1 and the buffer B2 are configured to provide a short delay to achieve reliable timing.

A working process of the embodiment of the present disclosure includes: when the output voltage compensation signal Vcomp is higher than the second reference voltage Vref2, the second comparison signal Vcmp2 is at a high level, the sleep indication signal Sleep is set low, and the work indication signal Work is set high. The power switch of the switching power supply is controlled by the PWM control signal to be turned on and off periodically, and at the same time the first timing circuit Timer1 and the second timing circuit Timer2 start timing at the rising edge of the work indication signal Work.

The second timing circuit Timer2 outputs the high-level second timing signal Vt2 when the time value of the second timing circuit Timer2 is not greater than the second time value T2. If the rising edge of the work indication signal Work occurs again in this stage, it indicates the cycle duration of the work indication signal Work is less than the second time value T2 characterizing the second frequency, that is, the Burst frequency is higher than the second frequency, and thus the second adjustment signal Vreg2 output by the second logic circuit A2 is valid, and then the second reference voltage Vref2 is increased by the second adjustment circuit, so that the cycle duration of the work indication signal Work is increased to reduce the Burst frequency. If the rising edge of the work indication signal Work has occurred again only after the second timing circuit Timer2 finishes timing, the second timing circuit Timer2 outputs a low level at this time, the second timing signal Vt2 of the second logic circuit A2 is in an invalid state, and the second reference voltage Vref2 will remain unchanged.

The first timing circuit Timer1 outputs a high-level first timing signal Vt1 when the time value of the first timing circuit Timer1 is within the first time value T1, and the NOT gate N1 outputs a low level. If a rising edge of the work indication signal Work appears again in this stage, it means that the cycle duration of the work indication signal Work is less than the first time value T1 characterizing the first frequency, that is, the Burst frequency is higher than the first frequency, and thus the first adjustment signal Vreg1 output by the first logic circuit A1 is in an invalid state, and the second reference voltage Vref2 will remain unchanged; if the rising edge of the work indication signal Work appears only after the first timing circuit Timer1 finishes timing, it indicates that the cycle duration of the work indication signal Work is greater than the first time value T1 characterizing the first frequency, that is, the Burst frequency is lower than the first frequency. At this time, the first timing circuit Timer1 outputs a low-level first timing signal Vt1, and the NOT gate N1 outputs a high level, and the first adjustment signal Vreg1 output by the first logic circuit A1 is valid, and thus the second reference voltage Vref2 is reduced by the first adjustment circuit, so that the cycle duration of the work instruction signal Work is reduced to increase the Burst frequency.

Through the above-mentioned negative feedback control, the cycle duration of the work instruction signal Work is controlled between the first time value T1 characterizing the first frequency and the second time value T2 characterizing the second frequency, so that the frequency of the work instruction signal Work is limited between the first frequency and the second frequency, that is, the Burst frequency is controlled within a predetermined range, so that the noise at light load can be reduced.

Figure 5:
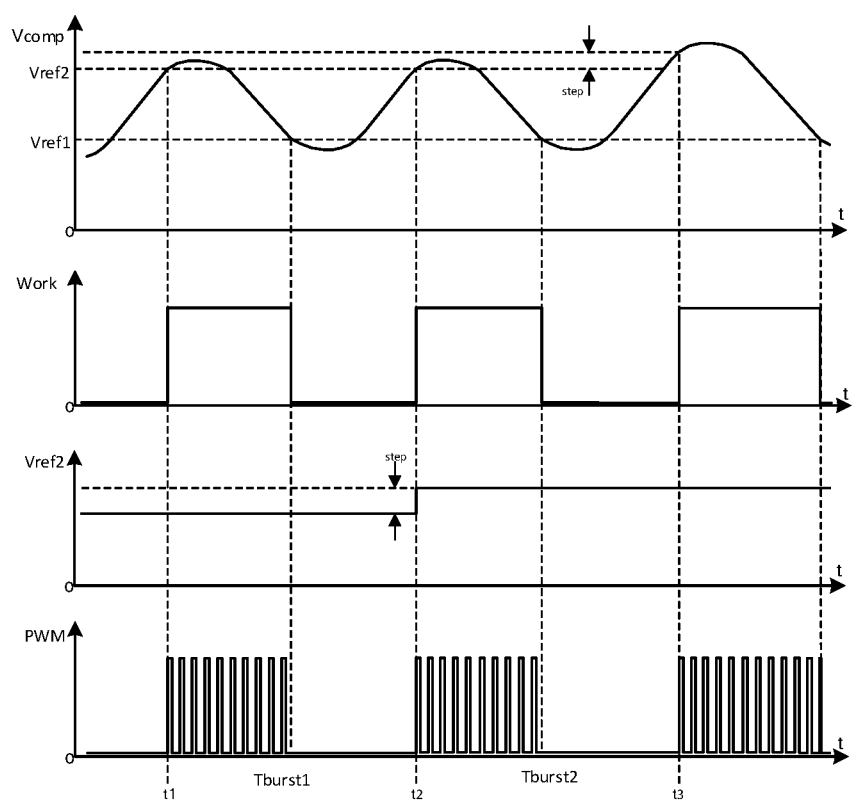
FIG. 5 shows a working waveform diagram of the intermittent power saving mode control circuit according to the present disclosure.

FIG. 5 shows a working waveform diagram of the intermittent power saving mode control circuit according to the present disclosure. This embodiment takes the condition that the Burst frequency is too high, and the second reference voltage Vref2 needs to be increased through feedback control to reduce the Burst frequency as an example for illustration.

At time t1, the rising edge of the work instruction signal Work appears, the PWM signal is put into work, and the two timing circuits Timer1 and Timer2 start timing.

At time t2, the rising edge of the work instruction signal Work again appears. At this time, the cycle duration Tburst1 of the work instruction signal Work is actually less than the second time value T2 characterizing the second frequency, that is, the Burst frequency is greater than the second frequency, indicating that the burst frequency is too high, thus, the second reference voltage Vref2 is increased, so that the cycle duration of the work instruction signal Work will become longer, thereby decreasing the Burst frequency. Specifically, the second reference voltage Vref2 can be increased by a preset step size Step.

At time t3, the cycle duration Tburst2 of the work instruction signal Work is greater than the second time value T2 representing the second frequency, that is, the Burst frequency is less than the second frequency, and the second reference voltage Vref2 remains unchanged. It can be known that a feedback circuit reduces the Burst frequency by increasing the second reference voltage Vref2.

Figure 6:
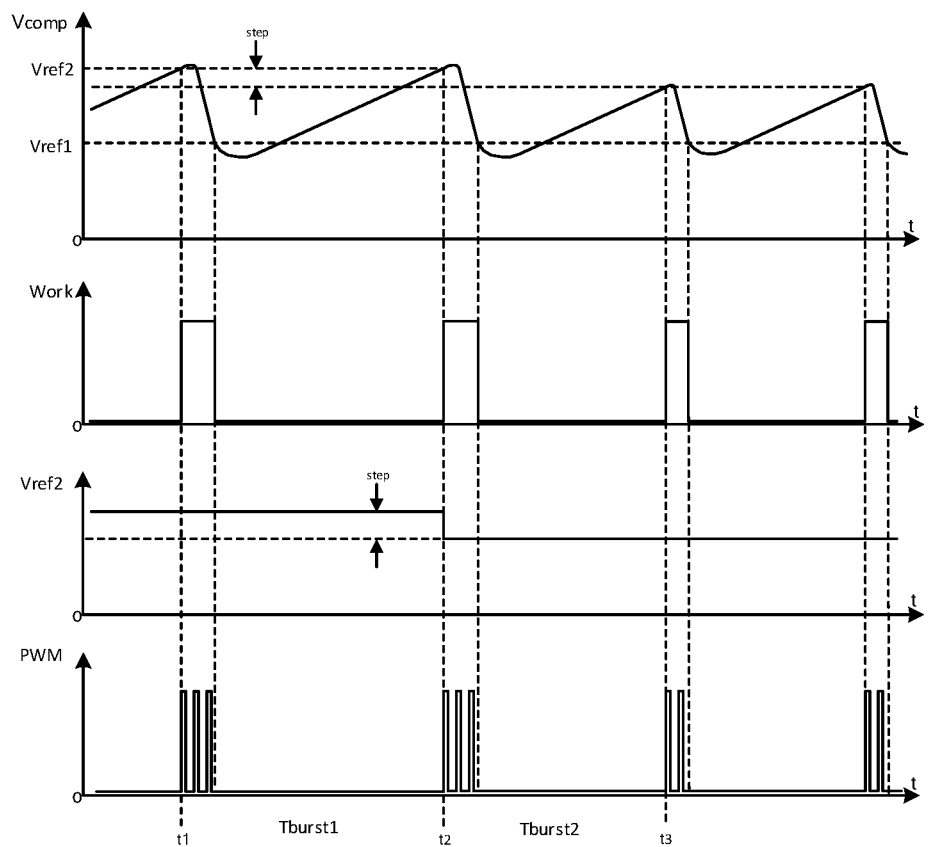
FIG. 6 shows another working waveform diagram of the intermittent power saving mode control circuit according to the present disclosure.
Figure 7:
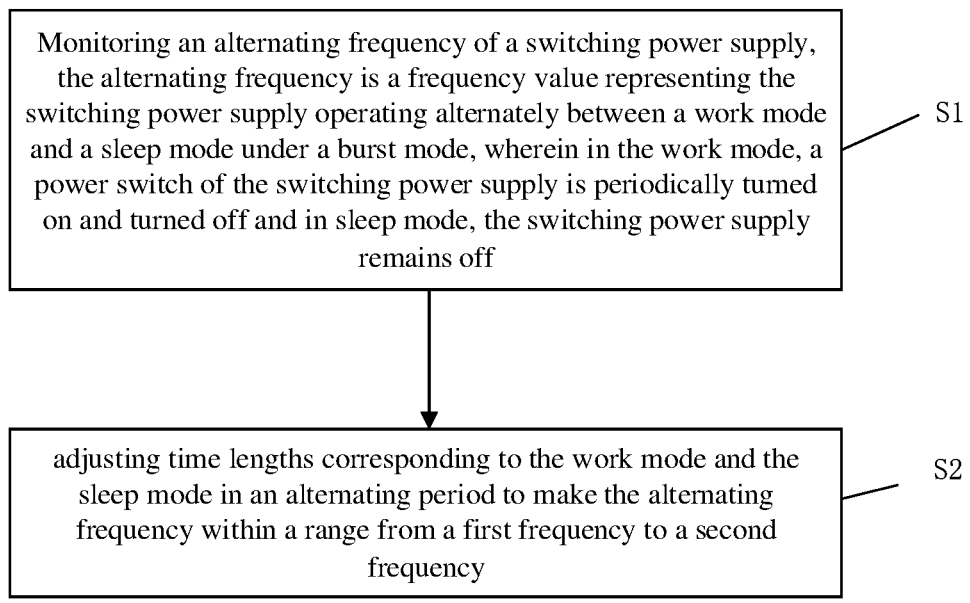
FIG. 7 shows a flowchart of an intermittent power saving mode control method according to an embodiment of the present disclosure.

FIG. 6 shows another working waveform diagram of the intermittent power saving mode control circuit according to the present disclosure. This embodiment takes the condition that Burst frequency is too low, and the second reference voltage Vref2 needs to be decreased through feedback control to increase the Burst frequency as an example for illustration.

At time t1, the rising edge of the work instruction signal Work appears, the PWM signal is put into work, and the two timing circuits Timer1 and Timer2 start timing.

At time t2, the rising edge of the work instruction signal Work again appears. At this time, the cycle duration Tburst1 of the work instruction signal Work is actually greater than the first time value T1 characterizing the first frequency, that is, the Burst frequency is less than the first frequency, indicating that the burst frequency is too low, and thus the second reference voltage Vref2 is decreased, so that the cycle duration of the work instruction signal Work will become shorter, thereby increasing the Burst frequency. Specifically, the second reference voltage Vref2 can be decreased by a preset step size Step.

At time t3, the cycle duration Tburst2 of the work instruction signal Work is less than the first time value T1 representing the first frequency, that is, the Burst frequency is larger than the first frequency, and the second reference voltage Vref2 remains unchanged. It can be known that a feedback circuit increases the Burst frequency by decreasing the voltage of the second reference voltage Vref2.

The above descriptions are only preferred embodiments of the present disclosure and are not used to limit the present disclosure. For those skilled in the art, the present disclosure can have various modifications and changes. Any modification, equivalent replacement, improvement, etc. made within the spirit and principle of the present disclosure should be included in the protection scope of the present disclosure.

What is claimed is:

1. An intermittent power saving mode control method, comprising:
    controlling a switching power supply to operate alternately between a work mode and a sleep mode under a burst mode;
    controlling the switching power supply to operate in the sleep mode according a first reference voltage, the first reference voltage is constant;
    controlling the switching power supply to operate in the work mode according to a second reference voltage;
    monitoring an alternating frequency of the switching power supply in the burst mode, wherein the alternating frequency is a frequency value that the switching power supply changes from a current work mode to a next work mode or from a current sleep mode to a next sleep mode, wherein in the work mode, a power switch of the switching power supply is periodically turned on and turned off and in sleep mode, the switching power supply remains off; and
    adjusting the second reference voltage according to the alternating frequency, so that the alternating frequency is within a range of a first frequency to a second frequency.

2. The intermittent power saving mode control method according to claim 1, wherein the alternating frequency is adjusted according to a magnitude relationship between the current alternating frequency and the first frequency and the second frequency.

3. The intermittent power saving mode control method according to claim 1, further comprising:

controlling the switching power supply to operate in the work mode or the sleep mode according to the output voltage compensation signal characterizing an error between an output voltage of the switching power supply and an expected value.

4. The intermittent power saving mode control method according to claim 3, further comprising:
controlling the switching power supply to operate in the sleep mode when the output voltage compensation signal drops below the first reference voltage; and
controlling the switching power supply to operate in the work mode when the output voltage compensation signal rises to be greater than the second reference voltage, wherein the second reference voltage is greater than the first reference voltage.

5. The intermittent power saving mode control method according to claim 1, wherein generating a mode indication signal according to the output voltage compensation signal, the first reference voltage, and the second reference voltage, and a frequency of the mode indication signal is the same as the alternating frequency, wherein the second reference voltage is adjusted according to the frequency of the mode indication signal, so that the alternating frequency is within the range of the first frequency to the second frequency.

6. The intermittent power saving mode control method according to claim 5, further comprising:
decreasing the second reference voltage when the frequency of the mode indication signal is less than the first frequency; and
increasing the second reference voltage when the frequency of the mode indication signal is greater than the second frequency, wherein, the second frequency is greater than the first frequency.

7. The intermittent power saving mode control method according to claim 5, wherein the second reference voltage remains unchanged when the frequency of the mode indication signal is greater than the first frequency and less than the second frequency.

8. An intermittent power saving mode control circuit, wherein the control circuit is configured to:
control a switching power supply to operate alternately between a work mode and a sleep mode under a burst mode;
control the switching power supply to operate in the sleep mode according a first reference voltage, the first reference voltage is constant;
control the switching power supply to operate in the work mode according to a second reference voltage;
monitor an alternating frequency of the switching power supply in the burst mode, wherein the alternating frequency is a frequency value that changes from a current work mode to a next work mode or from a current sleep mode to a next sleep mode, wherein in the work mode, a power switch of the switching power supply is periodically turned on and turned off and in sleep mode, the switching power supply remains off; and
adjust the second reference voltage according to the alternating frequency, so that the alternating frequency is within a range of a first frequency to a second frequency.

9. The intermittent power saving mode control circuit according to claim 8, wherein the alternating frequency is adjusted according to a magnitude relationship between the current alternating frequency and the first frequency and the second frequency.

10. The intermittent power saving mode control circuit according to claim 8, wherein the control circuit is configured to control the switching power supply to operate in the work mode or the sleep mode according to an output voltage compensation signal characterizing an error between an output voltage of the switching power supply and an expected value.

11. The intermittent power saving mode control circuit according to claim 10, wherein the control circuit is configured to control the switching power supply to operate in the sleep mode when the output voltage compensation signal drops below the first reference voltage, and control the switching power supply to operate in the work mode when the output voltage compensation signal rises to be greater than the second reference voltage, wherein the second reference voltage is greater than the first reference voltage.

12. The intermittent power saving mode control circuit according to claim 8, further comprising:
a mode indication signal generating circuit configured to generate a mode indication signal according to the output voltage compensation signal, the first reference voltage, and the second reference voltage, and a frequency of the mode indication signal is the same as the alternating frequency; wherein, the second reference voltage is adjusted according to the frequency of the mode indication signal, so that the alternating frequency is within the range of the first frequency to the second frequency.

13. The intermittent power saving mode control circuit according to claim 12, wherein the control circuit is configured to decrease the second reference voltage when the frequency of the mode indication signal is less than the first frequency, and increase the second reference voltage when the frequency of the mode indication signal is greater than the second frequency, wherein the second frequency is greater than the first frequency.

14. The intermittent power saving mode control circuit according to claim 12, wherein the control circuit is configured to control the second reference voltage to remain unchanged when the frequency of the mode indication signal is greater than the first frequency and less than the second frequency.

15. The intermittent power saving mode control circuit according to claim 12, wherein when the switching power supply is in a light load condition, the mode indication signal switches between two states, so that the switching power supply enters an intermittent power saving mode; when the switching power supply is in a normal or heavy load condition, a state of the mode indication signal remains unchanged.

16. The intermittent power saving mode control circuit according to claim 12, wherein the mode indication signal generating circuit comprises:
a first comparator configured to compare the output voltage compensation signal with the first reference voltage and output a first comparison signal;
a second comparator configured to compare the output voltage compensation signal with the second reference voltage and output a second comparison signal;
a logic circuit configured to generate the mode indication signal according to the first comparison signal and the second comparison signal.

17. The intermittent power saving mode control circuit according to claim 12, further comprising:
a second reference voltage generating circuit configured to generate the second reference voltage according to the mode indication signal, a first time value characterizing the first frequency and a second time value characterizing the second frequency.

18. The intermittent power saving mode control circuit according to claim 17, wherein the second reference voltage generating circuit comprises:
   a first detection circuit, configured to detect whether a cycle duration of the mode indication signal exceeds the first time value characterizing the first frequency, and generate a first adjustment signal for instructing to decrease the second reference voltage when the cycle duration of the mode indication signal exceeds the first time value; and
   a second detection circuit, configured to detect whether the cycle duration of the mode indication signal is less than the second time value characterizing the second frequency, and generate a second adjustment signal for instructing to increase the second reference voltage when the cycle duration of the mode indication signal is less than the second time value; and
   an adjustment circuit, configured to adjust the second reference voltage according to the first adjustment signal and the second adjustment signal.

19. The intermittent power saving mode control circuit according to claim 18, wherein the first detection circuit comprises:
   a first timing circuit configured to generate a first timing signal according to the mode indication signal and the first time value;
   a first one-shot circuit configured to generate a first single pulse signal according to the mode indication signal;
   a first logic circuit, configured to generate the first adjustment signal according to the first timing signal and the first single pulse signal;
   the second detection circuit comprises:
   a second timing circuit configured to generate a second timing signal according to the mode indication signal and the second time value;
   a second one-shot circuit configured to generate a second single pulse signal according to the mode indication signal;
   a second logic circuit configured to generate the second adjustment signal according to the second timing signal and the second single pulse signal.

20. The intermittent power saving mode control circuit according to claim 18, wherein the adjustment circuit comprises:
   a first adjustment circuit, configured to reduce the second reference voltage when the first adjustment signal is valid;
   a second adjustment circuit, configured to increase the second reference voltage when the second adjustment signal is valid; and
   an adjusting capacitor, coupled to both the first adjustment circuit and the second adjustment circuit, and configured to generate the second reference voltage at a non-grounded port.

* * * * *